United States Patent [19]
Chou

[11] Patent Number: 5,725,075
[45] Date of Patent: Mar. 10, 1998

[54] BRAKING PRECAUTIONARY SYSTEM FOR VEHICLES

[76] Inventor: Shih-Hsiung Chou, c/o Hung Hsing Patent Service Center, P.O. Box 55-1670, Taipei, Taiwan

[21] Appl. No.: 781,938

[22] Filed: Dec. 3, 1996

[51] Int. Cl.[6] .............................. F16D 66/00; B60Q 1/22
[52] U.S. Cl. ..................... 188/1.11 E; 340/463; 340/466; 340/468; 340/479
[58] Field of Search .................. 188/1.11 E, 1.11 R; 340/463, 466, 467, 468, 479

[56] References Cited

U.S. PATENT DOCUMENTS

| 3,774,152 | 11/1973 | Tandy | 340/466 X |
|---|---|---|---|
| 4,730,181 | 3/1988 | Perkins | 340/467 |
| 4,812,807 | 3/1989 | Davis et al. | 340/464 |
| 5,376,918 | 12/1994 | Vinciguerra et al. | 340/467 X |
| 5,381,135 | 1/1995 | Blount | 340/463 X |

FOREIGN PATENT DOCUMENTS 2000892  7/1971  Germany ................. 188/1.11

*Primary Examiner*—Peter M. Poon

[57] ABSTRACT

A braking precautionary system for a vehicle includes a speed controller electrically connected to a speed sensor for sensing a driving speed of the vehicle and operatively outputting an electric current to actuate a relay when the driving speed exceeds a predetermined value as preset in the speed controller for turning on a controller switch connected to a warning lamp circuit having a warning lamp juxtapositioned to a brake lamp of the vehicle; and an accelerator-pedal contactor switch electrically connected to the warning lamp circuit and operatively switched on when releasing the accelerator pedal, whereby upon releasing of the accelerator pedal for deceleration and just before depressing the brake pedal, the warning lamp of the warning lamp circuit will be lit before the lighting of a brake lamp for precautioning the rear car for ensuring driving safety.

5 Claims, 3 Drawing Sheets

BRAKING PRECAUTIONARY SYSTEM FOR VEHICLES

BACKGROUND OF THE INVENTION

A conventional car is provided with stop lights on at least a rear portion of the car for warning purposes, whereby upon depressing of the brake pedal, the stop lights will be lit for warning a rear car for preventing collision or traffic accident especially when driving at a high speed on a free way.

Since it is an instant time for a driver in a rear car to take action for braking the rear car after watching the lighting of the stop lights of the front car, the reaction time for the driver of the rear car is so short which may not be enough to well stop the rear car, thereby still causing collision with the front car to incur traffic accident or injury especially when the distance between the front and rear cars is not kept for a safety distance.

Therefore, the present inventor has invented a precautionary system to light a warning lamp for early cautioning the rear car just upon releasing of the accelerator pedal and before the depression of the brake pedal for traffic safety.

SUMMARY OF THE INVENTION:

The object of the present invention is to provide a braking precautionary system for a vehicle including a speed controller electrically connected to a speed sensor for sensing a driving speed of the vehicle and operatively outputing an electric current to actuate a relay when the driving speed exceeds a predetermined value as preset in the speed controller for turning on a controller switch connected to a warning lamp circuit having a warning lamp juxtapositioned to a brake lamp of the vehicle; and an accelerator-pedal contactor switch electrically connected to the warning lamp circuit and operatively switched on when releasing the accelerator pedal for decelerating the driving speed, whereby upon releasing of the accelerator pedal just ready for depressing the brake pedal, the warning lamp of the warning lamp circuit will be lit before the lighting of brake lamp for precautioning the rear car for ensuring driving safety.

Figure 1:
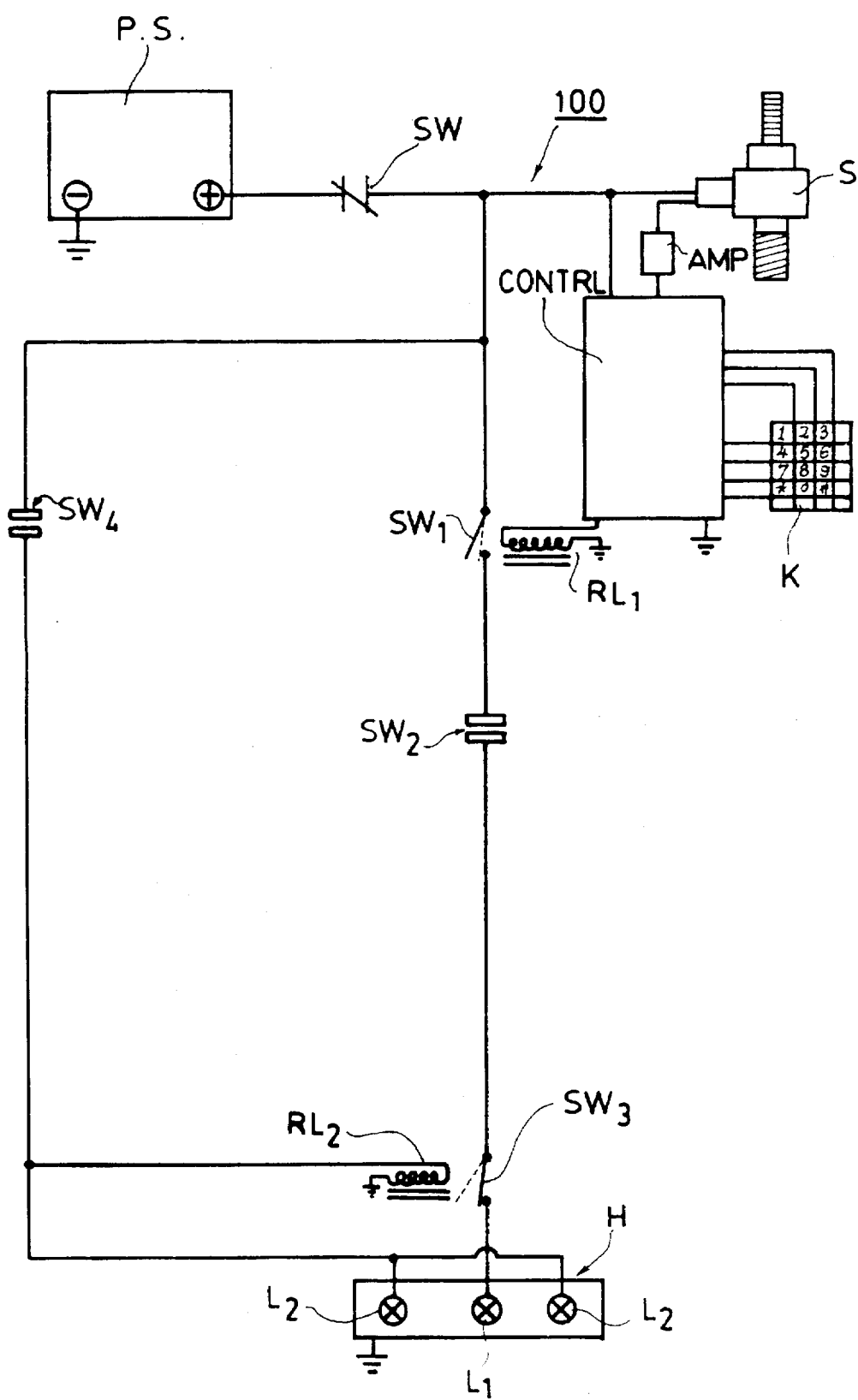
FIG. 1 is a block diagram of a braking precautionary circuit in accordance with the present invention.
Figure 2:
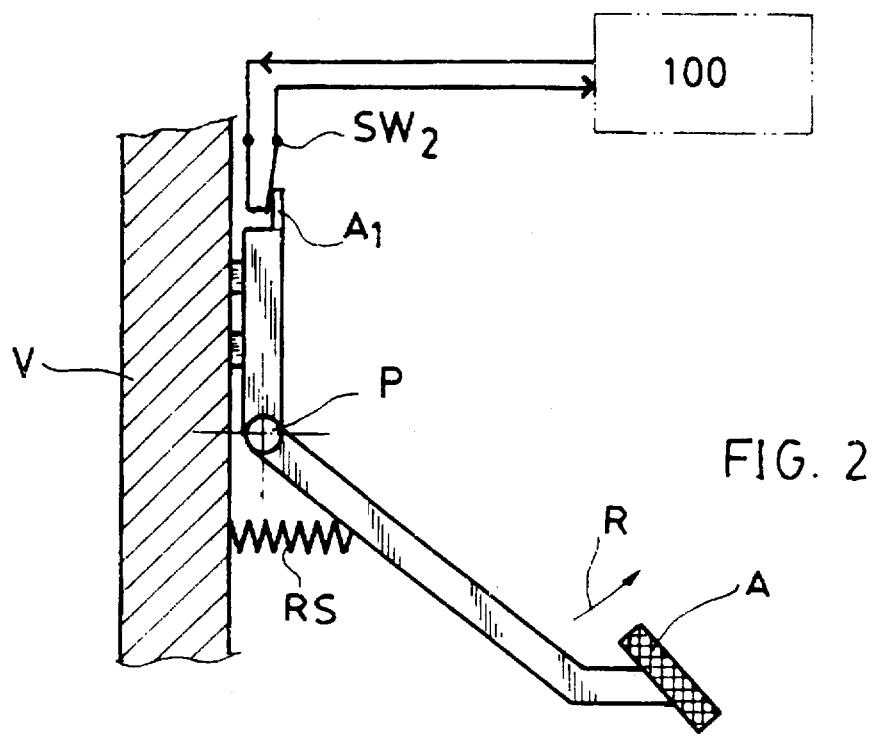
FIG. 2 shows a turn-on of a contactor switch when actuated by a releasing accelerator pedal of the vehicle for closing the braking precautionary circuit of the present invention.
Figure 3:
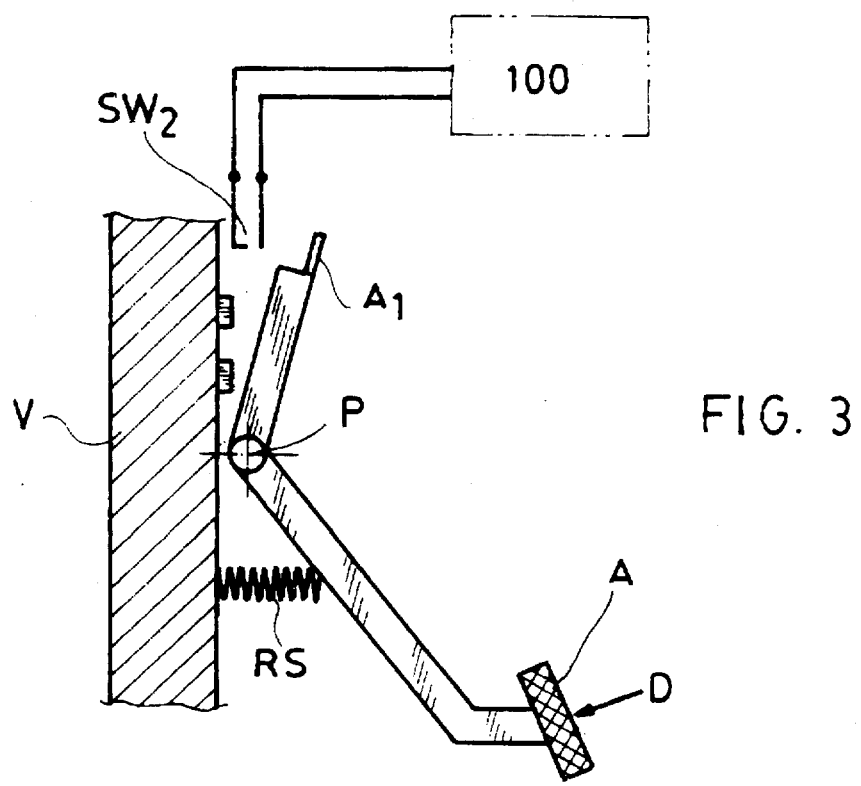
FIG. 3 shows a turn-off of the contactor switch for opening the braking precautionary circuit of the present invention when depressing the accelerator pedal.

DETAILED DESCRIPTION:

As shown in Figures 1–6, the braking precautionary system of a vehicle V (such as a car) of the present invention is provided with a braking precautionary circuit 100 as shown in FIG. 1, comprising: a speed sensor S for sensing a driving speed of the car and electrically connected to a power source P.S. of a vehicle V through an engine master switch SW which should be closed for operating the precautionary circuit 100 of the present invention; a speed controller CONTRL electrically connected with the speed sensor S through an amplifier AMP for amplifying a speed signal output from the speed sensor S to the speed controller CONTRL which may be an integrated circuit, a microprocessor or other circuit for setting a predetermined speed value (for instance, 35 miles per hour or other values) as adjusted and input through a keyboard K or other input methods; a controller-actuated switch SW1 normally opened and electrically connected between the power source P.S. and a warning lamp L1; a controller relay RL1 electrically connected to an output of the speed controller CONTRL and operatively actuated by an electric signal output from the speed controller CONTRL when the driving speed as sensed by the speed sensor S exceeds the predetermined value as preset in the speed controller CONTRL for turning on the controller-actuated switch SW1 as electromagnetically attracted and closed by the controller relay RL1; an accelerator contactor switch SW2 having a pair of contactors normally opened when depressing (D) the accelerator pedal A as shown in FIG. 3 and operatively switched on as urged by a contacting arm member A1 formed on a distal end of the pedal pivot P opposite to the accelerator pedal as shown in FIG. 2 when releasing (R) the accelerator pedal A for decelerating the speed to be ready for depressing a brake pedal (not shown) for braking the vehicle V, with the accelerator contactor switch SW2 electrically connected between the warning lamp L1 and the controller-actuated switch SW1 a brake-actuated switch SW3 normally closed and electrically connected between the accelerator contactor switch SW2 and the warning lamp L1 and a brake relay RL2 electrically connected to a brake contactor switch SW4 having a pair of contactors operatively actuated by a brake pedal for closing the pair of contactors of the brake contactor switch SW4 for actuating the brake relay RL2 for electromagnetically attracting and switching off the brake-actuated switch SW3; thereby turning off the circuit of warning lamp L1.

Figure 4:
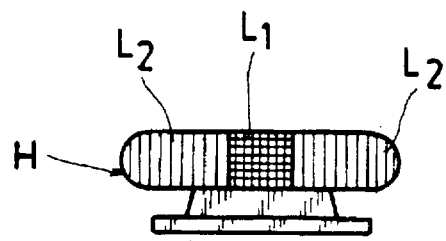
FIG. 4 is a rear-view illustration of the warning lamp and the brake lamps secured in a housing mounted on a rear portion of the vehicle.
Figure 5:
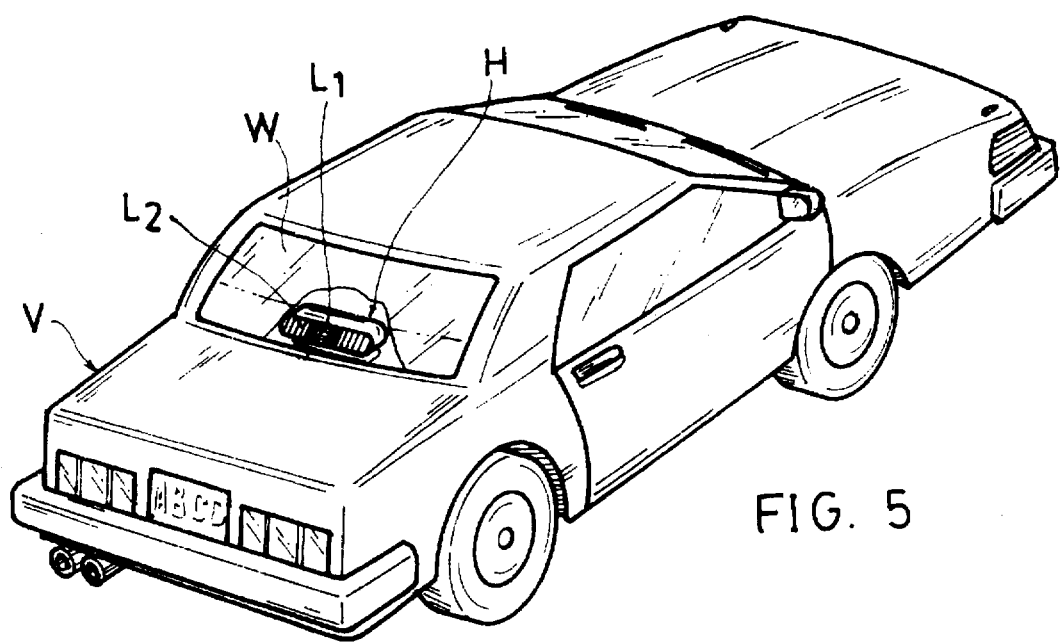
FIG. 5 is a perspective view of the present invention as mounted in a car.

The warning lamp L1 of the braking precautionary circuit 100 of the present invention is secured in a housing H and may be sandwiched in between two brake lamps (or stop lights) L2 as shown in FIGS. 4, 5; or the warning lamp L1 is secured juxtapositional to a stop light which is already mounted in a rear portion of a car V.

Figure 6:
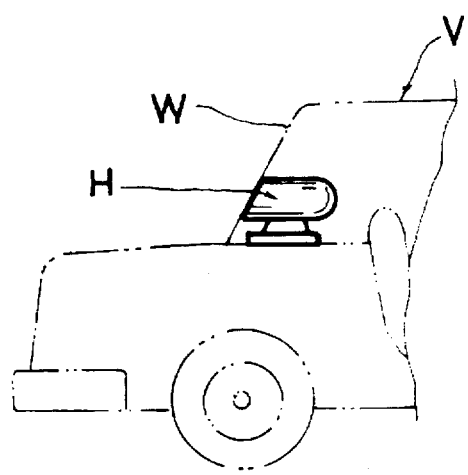
FIG. 6 is a partial side view of the housing for storing the warning lamp of the present invention.

The housing H having the warning lamp L1 of the present invention and the stop lights L2 stored in the housing H may be mounted in a rear portion of the car contiguous to a rear window W as shown in FIGS. 5, 6 for warning a rear car.

The accelerator contactor switch SW2 is closed by the contacting arm member A1 which is formed at a distal end of the pedal pivot P opposite to the accelerator pedal A which is pivotally mounted in the car by the pivot and normally restored upwardly by a restoring spring RS retained between the pedal A and the car V as shown in FIG. 2, whereby upon releasing (R) of the accelerator pedal A for decelerating the speed just ready for braking the car, the contacting arm member A1 of the accelerator pedal A will be biased to depress and close the pair of contactors of the accelerator contactor switch SW2 for closing the braking precautionary circuit 100 as shown in FIG. 1 when the controller-actuated switch SW1 is turned on when the car driving speed exceeds the predetermined value.

The power source P.S. may be a battery as originally mounted in the car having 12 volts or 24 volts; or the power source may be supplied by a battery stored in a kit in which the major elements of the present invention are secured in the kit. Of course, the braking precautionary circuit 100 of the present invention may be installed in a new car originally made by a car factory, not limited in the present invention.

The warning lamp L1 may have a yellow color in comparison with the red color of the conventional brake lamps or stop lights having different color from the warning lamp L1. However, the colors of the warning lamp L1 are not limited in the present invention.

In using the present invention by turning on the engine master switch SW as shown in FIG. 1 to supply the power from the power source P.S. to the precautionary circuit 100 of the present invention.

A pre-determined speed value (such as 35 miles per hour or other suitable values) is preset in the speed controller CONTRL; and a practical driving speed of the car as sensed by the speed sensor S is input into the speed controller for a comparison with the speed value as preset in the controller CONTRL. If the driving speed exceeds the pre-determined speed rate, an electric signal will be output from the controller CONTRL to actuate the controller relay RL1 to close the switch SW1 for preliminarily closing the precautionary circuit 100.

If the driver intends to brake his or her car, the accelerator pedal A will be first released (R) from its depressed (D) state (from FIG. 3 to FIG. 2) to decelerate the speed, just before treading the brake pedal (not shown) to brake the car. At this moment, the accelerator contactor switch SW2 will be actuated by the arm member A1 of the releasing accelerator pedal A to close the pair of contactors of switch SW2 to close the braking precautionary circuit 100 so as to light up the warning lamp L1 of the present invention for reminding or warning the rear car to prevent collision or traffic accident by the rear car. Since the switch SW3 is normally closed, the warning lamp L1 will be lit once the switches SW1, SW2 are closed.

Accordingly, just before the depression of brake pedal and before the lighting of brake lamps L2, the warning lamp L1 of the present invention will give a precaution to the rear car driver for ensuring traffic safety. Like a yellow light (caution signal) of a traffic light posted at a cross road before lighting the red light (stop signal), it will give a prewarning for the rear car driver in order to reduce the driving speed to prevent hitting on the front car.

Once depressing the brake pedal to close the contactors of the contactor switch SW4, the relay RL2 will be actuated to electromagnetically attract and open the switch SW3 to open the braking precautionary circuit 100 to switch off the warning lamp L1. Since the contactor switch SW4 actuated by the brake pedal is originally electrically connected to the brake lamps or stop lights L2, the brake lamps L2 will be lit up to indicate the braking of the front car to remind or warn the rear car for a suitable or timely response.

Therefore, the warning lamp L1 will be lit up, according to the present invention, only after releasing the accelerator pedal A and before depressing the brake pedal; and when the car driving speed exceeds a predetermined value such as a high speed over 35 miles per hour or other preset values. A precautionary optical signal as effected by the warning lamp L1 of the present invention will remind a rear car driver for taking an early action or response such as to reduce his (her) driving speed to be helpful for traffic safety. When the brake pedal is then depressed to actuate SW4 to light up the brake lamps L2 and the RL2 will also be actuated to switch off SW3 to turn off warning lamp L1, thereby warning the rear car about the braking action of the front car.

After the driving speed goes down to a normal rate to be less than the predetermined value, the switch SW1 will be switched off to turn off the warning lamp L1 for a normal driving of the car.

The present invention is superior to a conventional car light system by adding a precautionary warning lamp (LI) in addition to the original brake lamps or stop lights for a safer driving of vehicles.

I claim:

1. A vehicle braking precautionary system including: a braking precautionary circuit (100) comprising:

a speed controller (CONTRL) electrically connected with a speed sensor (S) which is provided for sensing a vehicle driving speed, and operatively receiving a speed signal output from said speed sensor to be compared with a predetermined speed value preset in said speed controller;

a controller-actuated switch (SW1) normally opened and electrically connected between a power source (P.S.) and a warning lamp (L1);

a controller relay (RL1) electrically connected to an output of the speed controller (CONTRL) and operatively actuated by an electric signal output from said speed controller (CONTRL) when a driving speed as sensed by the speed sensor (S) exceeds the predetermined value as preset in said speed controller for electromagnetically attracting and closing the controller-actuated switch (SW1); an accelerator contactor switch (SW2) normally opened and operatively switched on as actuated by an accelerator pedal (A) when releasing the accelerator pedal and just ready for depressing the brake pedal, with said accelerator contactor switch (SW2) electrically connected between said controller-actuated switch (SW1) and a brake-actuated switch (SW3);

said brake-actuated switch (SW3) normally closed and electrically connected between said accelerator contactor switch (SW2) and said warning lamp (L1);

a brake relay (RL2) electrically connected to a brake contactor switch (SW4) which is operatively actuated by the brake pedal for braking the vehicle and for switching on at least a brake lamp (L2);

said brake relay (RL2) operatively actuated by closing said brake contactor switch (SW4) when depressing the brake pedal for electromagnetically attracting and switching off said brake-actuated switch (SW3); and said power source (P.S.) powering said speed sensor (S), said speed controller (CONTRL), said warning lamp (L1) and said brake lamp (L2);

whereby when a high speed of the vehicle is sensed by said speed sensor (S) and exceeds a predetermined speed value as preset in said speed controller (CONTRL), said controller relay (RL1) will be actuated to close the controller-actuated switch (SW1), and upon releasing of the accelerator pedal (A) for decelerating the driving speed to close the accelerator contactor switch (SW2) to close the braking precautionary circuit (100), the warning lamp (L1) will be lit to give precautionary warning to a rear car.

2. A vehicle braking precautionary system according to claim 1, wherein said accelerator pedal (A) includes a contacting arm member (A1) formed on a distal end of a pivot (P) of said accelerator pedal (A) pivotally mounted in the vehicle by said pivot (P), said contacting arm member (A1) operatively depressing and closing said accelerator contactor switch (SW2) when releasing said accelerator pedal (A) for decelerating the driving speed.

3. A vehicle braking precautionary system according to claim 1, wherein said speed controller (CONTRL) is a microprocessor including means for inputing adjustable predetermined speed value into said controller to be compared with the speed value of a speed signal as output from said speed sensor (S).

4. A vehicle braking precautionary system according to claim 1, wherein said warning lamp (L1) is juxtapositioned to said brake lamp (L2) and mounted in a rear portion of the vehicle.

5. A vehicle braking precautionary system according to claim 4, wherein said warning lamp (L1) and said brake lamp (L2) are secured in a housing (H) mounted in a rear portion of the vehicle.

* * * * *